United States Patent
Dopiro et al.

(10) Patent No.: US 10,509,797 B2
(45) Date of Patent: *Dec. 17, 2019

(54) SYSTEMS AND METHODS TO AVOID COLLISIONS IN ESTABLISHING REAL-TIME COMMUNICATION CONNECTIONS

(71) Applicant: Ingenio, LLC, San Francisco, CA (US)

(72) Inventors: Olena Dopiro, San Francisco, CA (US);
Iulia Stefan, Berkeley, CA (US);
Geoffrey Wagner Skow, San Francisco, CA (US)

(73) Assignee: INGENIO, LLC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,853

(22) Filed: May 11, 2018

(65) Prior Publication Data

US 2018/0260452 A1 Sep. 13, 2018

Related U.S. Application Data

(63) Continuation of application No. 14/584,745, filed on Dec. 29, 2014, now Pat. No. 9,971,817.

(51) Int. Cl.
*G06F 17/30* (2006.01)
*G06F 16/248* (2019.01)
(Continued)

(52) U.S. Cl.
CPC .......... *G06F 16/248* (2019.01); *G06Q 10/02* (2013.01); *G06Q 10/06* (2013.01); *H04M 3/5191* (2013.01); *H04M 2201/42* (2013.01)

(58) Field of Classification Search
CPC . G06F 17/30554; G06Q 10/06; H04M 3/5191
See application file for complete search history.

(56) References Cited

U.S. PATENT DOCUMENTS 6,757,696 B2 6/2004 Multer et al.
6,801,899 B2 10/2004 Lauffer
(Continued)

FOREIGN PATENT DOCUMENTS

EP 1489529 12/2004
GB 2329046 3/1999
(Continued)

OTHER PUBLICATIONS

Wasik, Joann M., "Information for Sale: Commercial Digital Reference and AskA Services," Virtual Reference Desk, http://www.vrd.org/AskA/commAskA.html, Sep. 20, 1999.

(Continued)

*Primary Examiner* — Anil K Bhargava
(74) *Attorney, Agent, or Firm* — Greenberg Traurig, LLP

(57) ABSTRACT

A computing apparatus configured in the communication system to store data about advisers, including availability status of the advisers for real time communications with customers, ratings of the advisers by prior customers, compensate rates of the advisers, probability of being connected within a period of time for real time communication with customers, etc. The computing apparatus customizes the selection of lists of advisers for presentation to customers and/or the sequences of the lists to reduce collisions in concurrent requests for connections to same advisers for real time communication connections. The customization may include randomizing top portions of the lists, selecting and/or ranking the advisers in real time based on probability of advisers being connected within a period of time for real time communication with customers, etc.

18 Claims, 7 Drawing Sheets

(51) Int. Cl.
*H04M 3/51* (2006.01)
*G06Q 10/02* (2012.01)
*G06Q 10/06* (2012.01)

(56) References Cited

U.S. PATENT DOCUMENTS

| | | | |
|---|---|---|---|
| 6,968,367 B1* | 11/2005 | Vassar | G06Q 30/08 |
| | | | 709/202 |
| 7,787,609 B1 | 8/2010 | Flockhart et al. | |
| 7,995,717 B2 | 8/2011 | Conway et al. | |
| 8,452,655 B2 | 5/2013 | Altberg et al. | |
| 8,484,084 B2 | 7/2013 | Altberg et al. | |
| 8,538,768 B2 | 9/2013 | Agarwal et al. | |
| 8,681,778 B2 | 3/2014 | Altberg et al. | |
| 8,687,783 B2 | 4/2014 | Altberg et al. | |
| 9,185,222 B1 | 11/2015 | Govindarajan et al. | |
| 9,185,238 B1 | 11/2015 | Freeland et al. | |
| 9,424,581 B2 | 8/2016 | Altberg et al. | |
| 9,444,937 B2 | 9/2016 | Dopiro | |
| 9,509,846 B1 | 11/2016 | Jandwani | |
| 9,971,817 B2 | 5/2018 | Dopiro et al. | |
| 2001/0032244 A1 | 10/2001 | Neustel | |
| 2002/0010616 A1* | 1/2002 | Itzhaki | G06Q 30/02 |
| | | | 709/227 |
| 2003/0041032 A1* | 2/2003 | Ballin | G06Q 30/02 |
| | | | 705/51 |
| 2004/0039696 A1 | 2/2004 | Harmon et al. | |
| 2004/0161080 A1 | 8/2004 | Digate et al. | |
| 2004/0161090 A1 | 8/2004 | Digate et al. | |
| 2005/0114224 A1 | 5/2005 | Hodges et al. | |
| 2005/0216341 A1 | 9/2005 | Agarwal et al. | |
| 2006/0120281 A1 | 6/2006 | Schmidt et al. | |
| 2006/0178918 A1 | 8/2006 | Mikurak | |
| 2006/0262919 A1 | 11/2006 | Danson et al. | |
| 2006/0262920 A1 | 11/2006 | Conway et al. | |
| 2007/0165841 A1* | 7/2007 | Faber | H04M 1/2478 |
| | | | 379/441 |
| 2007/0174084 A1* | 7/2007 | Goldman | G06F 19/3481 |
| | | | 705/2 |
| 2008/0205625 A1 | 8/2008 | Mandalia et al. | |
| 2008/0205628 A1* | 8/2008 | Mandalia | H04M 3/42365 |
| | | | 379/265.11 |
| 2008/0263459 A1* | 10/2008 | Altberg | G06Q 50/00 |
| | | | 715/757 |
| 2009/0006115 A1 | 1/2009 | Schwarz | |
| 2009/0006174 A1* | 1/2009 | Lauffer | G06Q 10/0631 |
| | | | 705/7.13 |
| 2009/0016507 A1* | 1/2009 | Altberg | G06Q 30/02 |
| | | | 379/114.01 |
| 2009/0037309 A1 | 2/2009 | Altberg et al. | |
| 2009/0161856 A1 | 6/2009 | Lurie | |
| 2009/0216851 A1 | 8/2009 | Digate et al. | |
| 2009/0240561 A1 | 9/2009 | Altberg et al. | |
| 2009/0299887 A1 | 12/2009 | Shiran et al. | |
| 2013/0039483 A1 | 2/2013 | Wolfeld et al. | |
| 2013/0163744 A1 | 6/2013 | Velusamy | |
| 2013/0246053 A1 | 9/2013 | Scott et al. | |
| 2014/0003599 A1* | 1/2014 | Kim | H04M 3/5191 |
| | | | 379/265.09 |
| 2014/0040131 A1 | 2/2014 | Andrews et al. | |
| 2014/0140497 A1 | 5/2014 | Ripa et al. | |
| 2014/0163960 A1 | 6/2014 | Dimitriadis et al. | |
| 2014/0257989 A1 | 9/2014 | Prakah-Asante et al. | |
| 2015/0317703 A1* | 11/2015 | Kharraz Tavakol | |
| | | | G06Q 30/0283 |
| | | | 705/2 |
| 2016/0127557 A1 | 5/2016 | McCormack et al. | |
| 2016/0191710 A1 | 6/2016 | Dopiro | |
| 2016/0191711 A1 | 6/2016 | Dopiro et al. | |
| 2016/0373579 A1 | 12/2016 | Dopiro | |

FOREIGN PATENT DOCUMENTS

| | | |
|---|---|---|
| JP | 0923344 | 12/1997 |
| JP | 09319812 | 12/1997 |
| WO | 9802835 | 1/1998 |
| WO | 9804061 | 1/1998 |
| WO | 9813765 | 4/1998 |
| WO | 0057326 | 9/2000 |
| WO | 0120518 | 3/2001 |
| WO | 0127825 | 4/2001 |
| WO | 0184415 | 11/2001 |
| WO | 0237470 | 5/2002 |
| WO | 2008008653 | 1/2008 |

OTHER PUBLICATIONS

About Intellectexchange.Com, Inc., company information retrieved from http://www.intellectexchange.com/ About.asp, pp. 1-12, available at least by Aug. 8, 2000.

expertcity.com, "About Us," company information retrieved from http://www.expertcity.com, available at least by Apr. 9, 2000.

Jambo, "Welcome to Jambo—The Leader in Pay-Per-Call Solutions," company information retrieved from http://www.jambo.com, available at least by Oct. 17, 2005.

Kabeya, Kiyoshi et al., "A New Teleconsultation Terminal System Using ISDN," NTT Review, vol. 3, No. 4, pp. 37-43, Jul. 1991.

Keen.Com, "Keen.Com Launches First Live Answer Community, Connects People with Information to Share Over Their Standard Telephone," company press release, Nov. 8, 1999.

Ludwig, L.F. et al., "Laboratory for Emulation and Study of Integrated and Coordinated Media Communication," Conference on Office Information Systems, pp. 283-291, Mar. 23-25, 1988.

\* cited by examiner

SYSTEMS AND METHODS TO AVOID COLLISIONS IN ESTABLISHING REAL-TIME COMMUNICATION CONNECTIONS

RELATED APPLICATIONS

The present application is a continuation application of U.S. patent application Ser. No. 14/584,745, filed Dec. 29, 2014 and issued as U.S. Pat. No. 9,971,817 on May 15, 2018, the entire disclosure of which application is hereby incorporated herein by reference.

FIELD OF THE TECHNOLOGY

At least some embodiments of the present disclosure relate to real-time communication systems in general and, more specifically but not limited to, establishing connections for real-time communications.

BACKGROUND

U.S. Pat. No. 6,223,165, entitled "Method and apparatus to connect consumer to expert", discloses a server which can store and display information about experts and assist in connecting the expert and consumer for real-time communication. In response to a keyword search or a category selection, the server presents a list of experts, including information such as availability, avatar, certification, compensation rate, quality score, etc. of the experts. After a consumer selects an expert from the list, a central controller places a telephone call to the consumer and a separate telephone call to the expert to establish a telephonic connection between the consumer and the expert. The central controller may monitor the duration of the telephonic connection to charge the consumer in accordance with the compensation rate of the expert and the length of the duration, and compensate the expert accordingly.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In a communication system in which advisers are presented to customers concurrently for selectively establishing real time communication connections based on user inputs, there are frequent collisions in different users being in processes leading to real time communication connections to a same adviser.

At least some embodiments of the present disclosure provide techniques to avoid, reduced, and/or resolve collisions of processes leading to real time communication connections to the same adviser.

Figure 1:
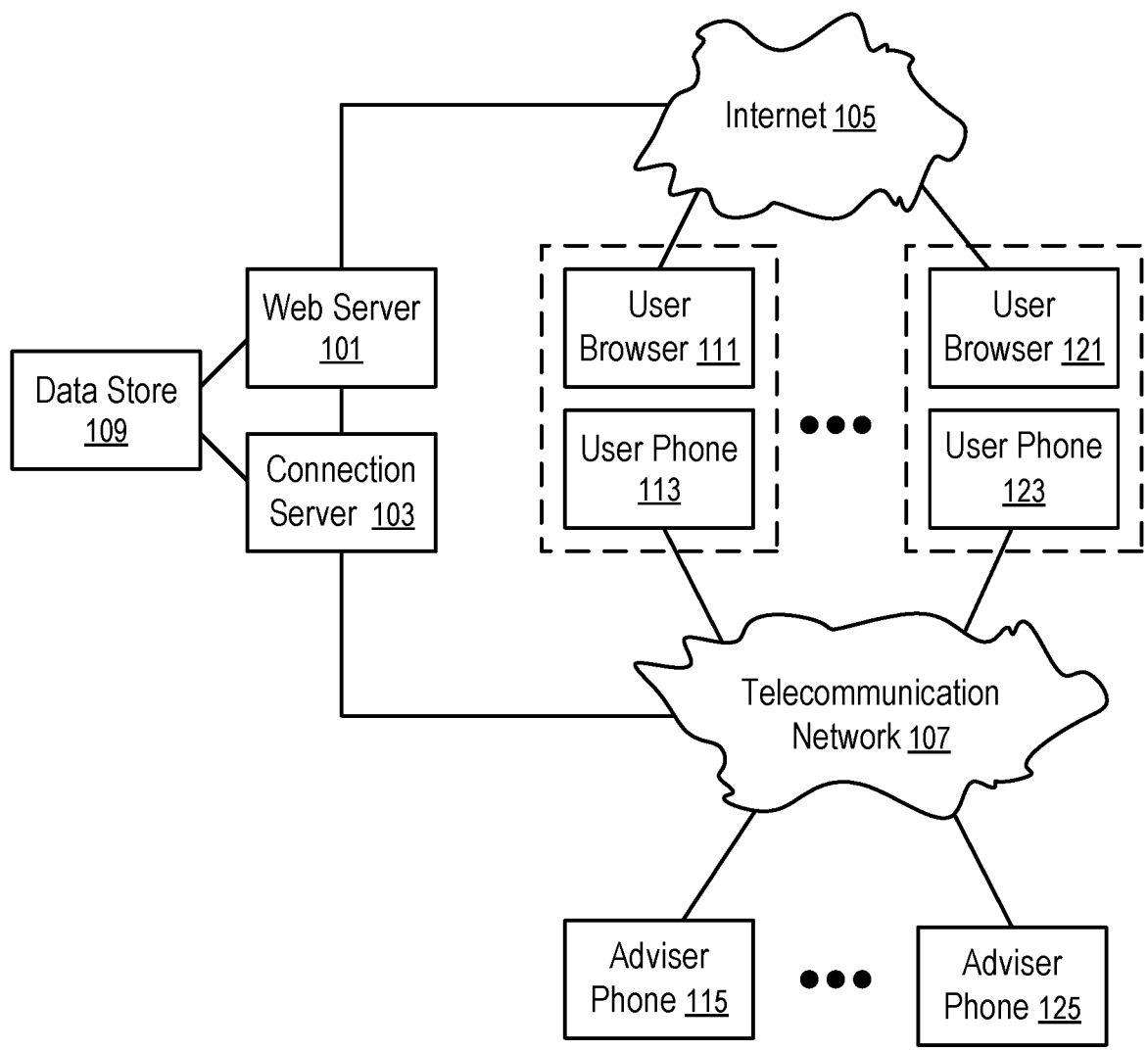
FIG. 1 shows a system in which techniques of various embodiments are implemented to avoid collisions in establishing real-time communication connections.

FIG. 1 shows a system in which techniques of various embodiments are implemented to avoid collisions in establishing real-time communication connections.

In FIG. 1, a data store (109) is configured to store the listings of advisers. A web server (101) is configured to present the listings of the advisers to the user browsers (111, . . . , 121) via the internet (105).

For example, the user browsers (111, . . . , 121) may be used to search for advisers offering services based on keywords, categories, topics, customer ratings, description, certification, expertise, prices, etc.

In view of the presentation of the advisers in the user browsers (111, . . . , 121), the users of the respective user browsers (111, . . . , 121) may selectively identify advisers and request the connection server (103) to establish connections between the users and the selected advisers.

For example, a user may use a user browser (111) to select an adviser based on a listing presented in the user browser (111), and identify the user phone (113) (e.g., by providing the phone number of the user phone (113)). An adviser phone (115) of the selected adviser is identified, for example, based on a phone number associated with the listing of the adviser in the data store (109). The connection server (103) is configured to call the user phone (113) and the adviser phone (115) separately and then bridge the calls to establish a telephonic connection between the user phone (113) and the adviser phone (115) via the telecommunication network (107).

The adviser phones (115, . . . , 125) and the user phones (113, . . . , 123) may be connected to traditional land-line of telephone networks, wireless telecommunication networks for mobile phones (e.g., cellular phones, smart phones), or data communication networks connected to computing devices running soft phones (e.g., via Voice over Internet Protocol or other communication protocols).

The user browsers (111, . . . , 121) may run in the same computing devices on which the respective user phones (113, . . . , 123) of the users are implemented, or in computing devices separate from the user phones (113, . . . , 123).

FIG. 1 illustrates a system to establish telephonic connections for real time communications. Alternatively or in combination, the user phones (113, . . . , 123) and the adviser phones (115, . . . , 125) can be replaced with computing devices, such as computers, smart phones, tablet computers, digital media players, personal digital assistants, etc., for other forms of real time communications, such as instant messaging, text chat, video chat, etc.

In one embodiment, there is a time gap between a user selecting an adviser via the user browser (111) and the connection server (103) attempting to establish a connection to the adviser phone (115) of the selected adviser.

Between the time gap the web server (101) is configured to identify the user, register the user as a member if the user is not already registered, verifying a source of payment of the user for the services to be provided by the selected adviser, obtain the phone number of the user phone (113), etc.

Between the time gap the connection server (103) is configured to establish a telephonic connection with the user phone (113) via the telecommunication network (107).

In some embodiments, the connection server (103) initiates the call to the user phone (113) identified by the user via the user browser (111), or stored in the data store (109) in association with an account of the user.

In some embodiments, the web server (101) may present a phone number of the connection server (103) to request the user to call the connection server (103) to establish the telephonic connection between the user phone (113).

After the telephonic connection between the user phone (113) is established, the connection server (103) is configured to verify the identity of the user (101), identify a source of payment for the services of the system and the adviser, and/or obtain an approval from the user to bill the source of payment in accordance with a compensation rate of the adviser, etc.

In general, after the user selects the adviser using the user browser (111), the system may fail to reach the execution point to establish a connection to the adviser phone (115) for various reasons, such as the user refuses to register, the user refuses to identify a source of payment, the user fails to pick up the call placed by the connection server (103) to the user phone (113), the user fails to call the connection server (103) from the user phone (113), the user fails to provide information for identity verification in the telephonic connection between the connection server (103) and the user phone (113), the user fails to approve the compensation rate of the adviser over the telephonic connection between the connection server (103) and the user phone (113), etc.

In general, there is a significant time gap between the user selecting the adviser and the connecting server (103) attempting a connection to the adviser phone (115); and there is a significant uncertainty as whether the connection process staring from the user selecting the adviser using the user browser (111) will successfully reach the point where the connection server (103) establishes the connection to the adviser phone (115).

After the connection between the connection server (103) and the adviser phone (115) is established, the corresponding adviser can be considered being unavailable for real time communications with other users. However, it is generally not desirable to consider the adviser selected by the user for connection as being unavailable, due to the significant time gap and the uncertainty discussed above.

In one embodiment, if the adviser indicates to the web server (101) that the adviser is available for real time communications with customers, and the connection server (103) has not yet established a connection with the adviser phone (115), the adviser is considered to be available for real time communications with other users, even after the user selecting the adviser using the user browser (111). Thus, the adviser can be presented to other users during the time gap between the user selecting the adviser and the connecting server (103) attempting a connection to the adviser phone (115). Such presentations increase the success rate of the adviser reaching a customer and reduce the time period the adviser has to wait to reach a customer, due to the uncertainty in the user (and other users) finally being connected to the adviser, and the significant time gap between a user selecting the adviser and the user can be actually connected to the adviser.

However, presenting the adviser concurrently to multiple users significantly increases the possibility that more than one user will select the adviser, leading to a collision where a first user phone (e.g., 113) is currently being connected to the adviser phone (115), while a second user phone (e.g., 123) is ready to be connected to the same adviser phone (115).

In one embodiment, to reduce the chance of collision, the system is configured to reduce the time gap between the user selecting the adviser and the connection server (103) connecting the user phone (113) to the adviser phone (115).

For example, the web server (101) and the connection server (103) are configured to reduce the operations to be performed between the user selecting the adviser and the connection server (103) connecting the user phone (113) to the adviser phone (115).

For example, the system may be configured to require the user (101) to register prior to selecting a particular adviser, or require the user (101) to confirm a selection of the adviser after the registration.

In one embodiment, the system is configured to customize the order of presentations of listings to reduce the chance of collisions, as further discussed below.

Figure 2:
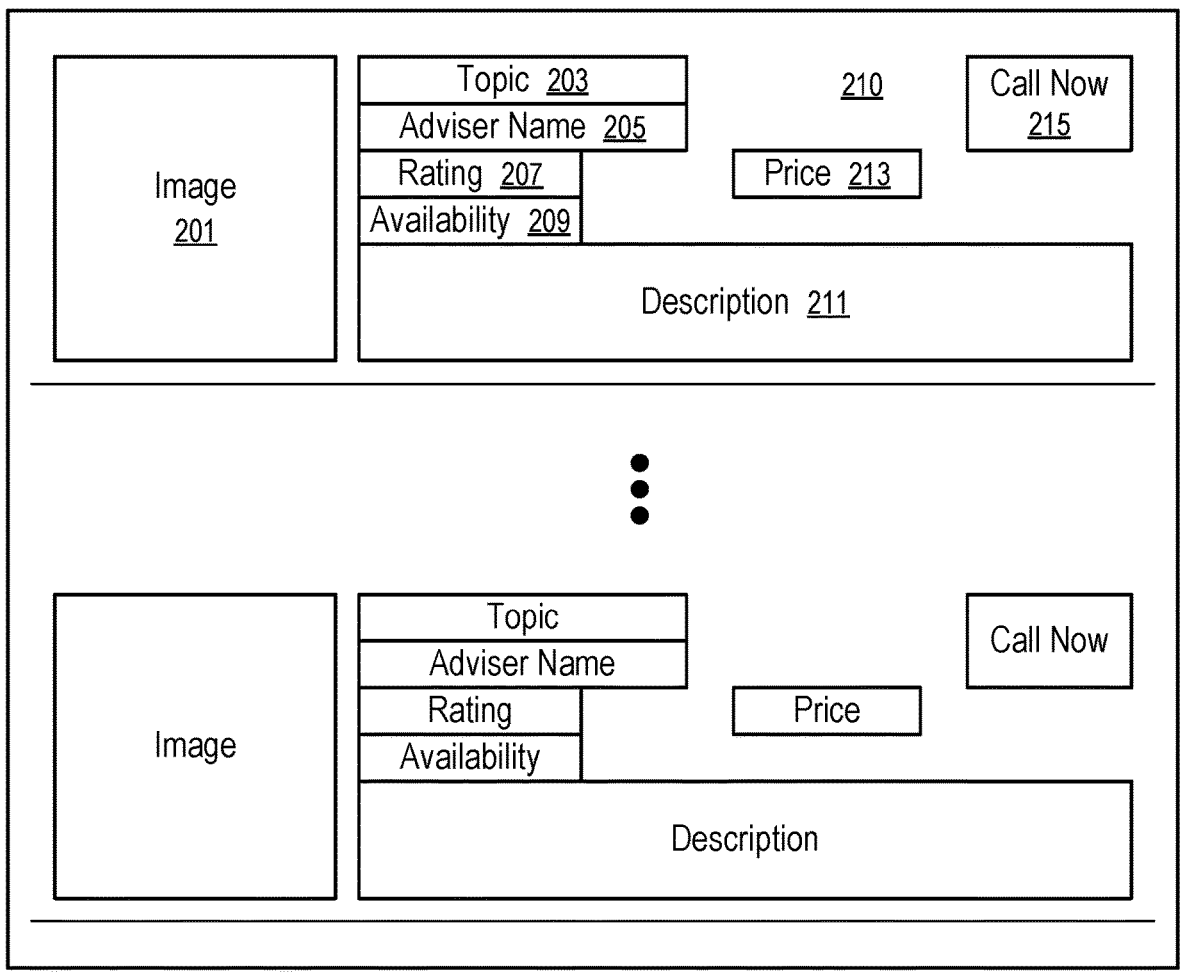
FIG. 2 illustrates a user interface to present advisers according to one embodiment.

FIG. 2 illustrates a user interface to present advisers according to one embodiment.

In FIG. 2, the user interface presents the listings of a plurality of advisers as a list. Each listing of an adviser may include content such as an image (201) representing the adviser, a topic (203) of advice offered by the adviser, a name (205) of the adviser, a rating (207) of the adviser by former customers of the adviser, the availability (209) of the adviser at the time the listing is presented in the user interface, the compensation price (213) of the adviser, a description (211) provided by the adviser about the services offered by the adviser, a "call now" button (215) that can be activated to select the advertiser for a connection to the adviser.

In one embodiment, the listings of different advisers are ranked and presented in accordance with the rankings of the advisers.

For example, the advisers may be ranked based on price (213), customer rating (207), availability (209), degree of matching with the search criteria specified by the user, and/or advertising bids of the advisers.

When user browsers (111, . . . , 121) submit similar search requests, the ranked and sorted list of the listings of advisers may appear in similar orders. Since the users are likely to select the top advisers in the list, the chance of collision increases when the lists presented to different users showing the same adviser at the top of the lists that are presented substantially concurrently.

Figure 3:
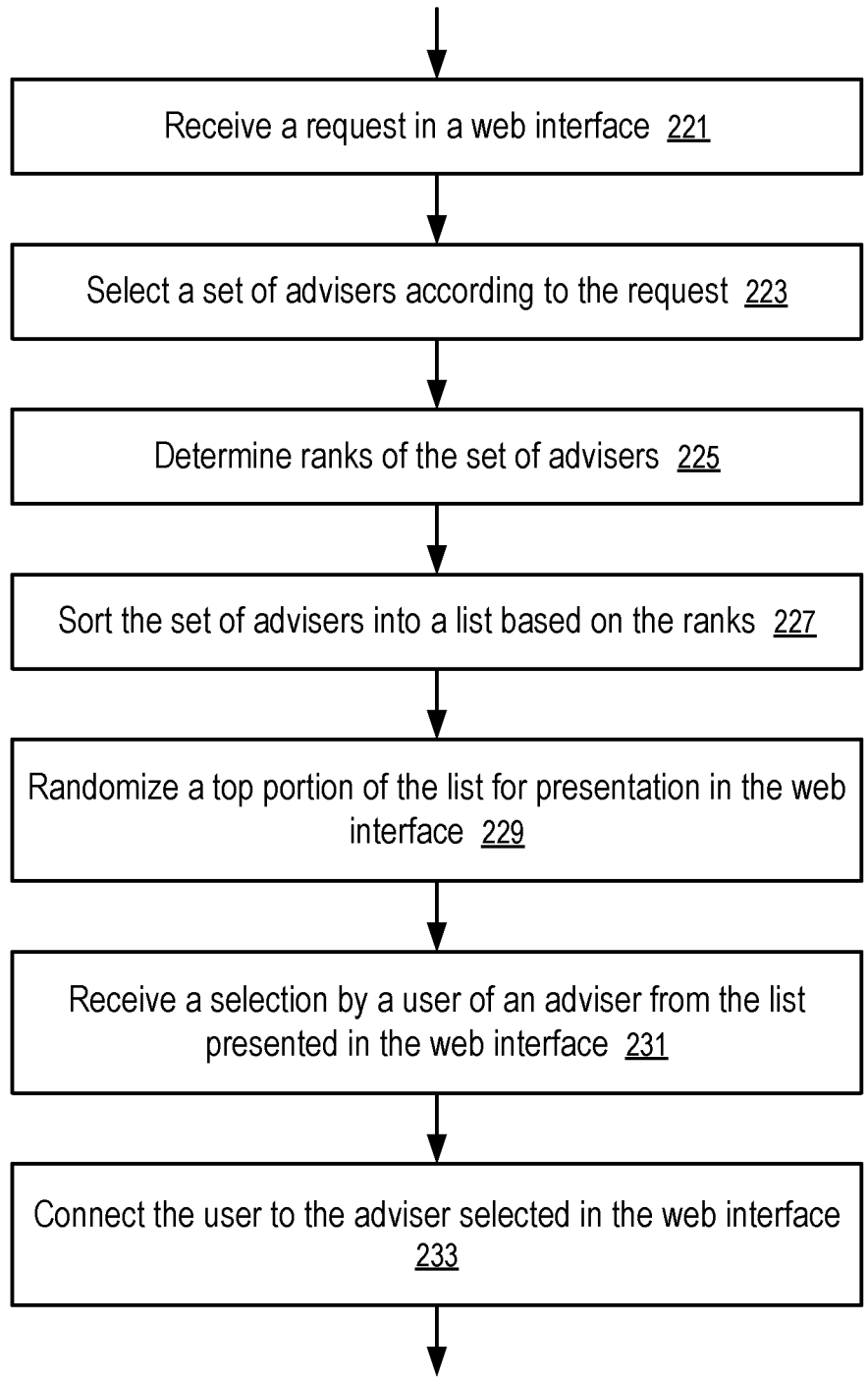
FIG. 3 shows a method to reduce collisions in establishing real-time communication connections according to one embodiment.

In one embodiment, to reduce the chance of collision, the top portions of the lists presented to the users are randomized, in a way illustrated in FIG. 3.

FIG. 3 shows a method to reduce collisions in establishing real-time communication connections according to one embodiment. In one embodiment, the method of FIG. 3 is implemented in a communication system illustrated in FIG. 1.

In one embodiment, the web server (101) is configured to receive (221) a request via a web interface presented using a user browser (111). In response, the web server (101) (or another server connected with the web server (101)) is configured to select (223) a set of advisers according to the request, based on the data in the data store (109). The server then determines (225) ranks of the set of advisers, sorts (227) the set of advisers into a list based on the ranks, and randomizes (229) a top portion of the list for presentation in the web interface.

After the web server (101) receives (231) a selection by a user of an adviser from the list presented in the web interface, the connection server (103) connects (233) the user to the adviser that was selected in the web interface by the user.

Since the order of the listings presented in the top portion of the list is randomized, the chance of different users selecting the same top adviser presented on their respective lists is reduced. Thus, the possibility of collision in requests for real time communications to the same top adviser is reduced.

In one embodiment, the web server (101) is configured to select the top portion of the list based on a predetermined count of listings (e.g., to randomize the order of the top 10 listings).

In one embodiment, the web server (101) is configured to score the listings in determining (225) the ranks of the set of advisers. For example, the ranking score of a listing of an adviser can be a function of the compensation price (213) of the adviser, the customer rating (207) of the adviser, the current availability status (209) of the adviser for real time communications, the degree of matching between the search terms provided by the user and the descriptions (211) of the listing, etc. The web server (101) is configured to randomize the order of the listings that have the score above a predetermined threshold.

In one embodiment, the web server (101) is configured to randomize the predetermined count of listings (e.g., randomize the order of the top 10 listings), when the number of listings having ranking scores above the threshold are more than the predetermined count.

In one embodiment, the web server (101) is configured to analyze the clustering of the listings based on the relative closeness of the scores of the listings with each other and randomize listings in the cluster having the highest ranking scores.

Figure 4:
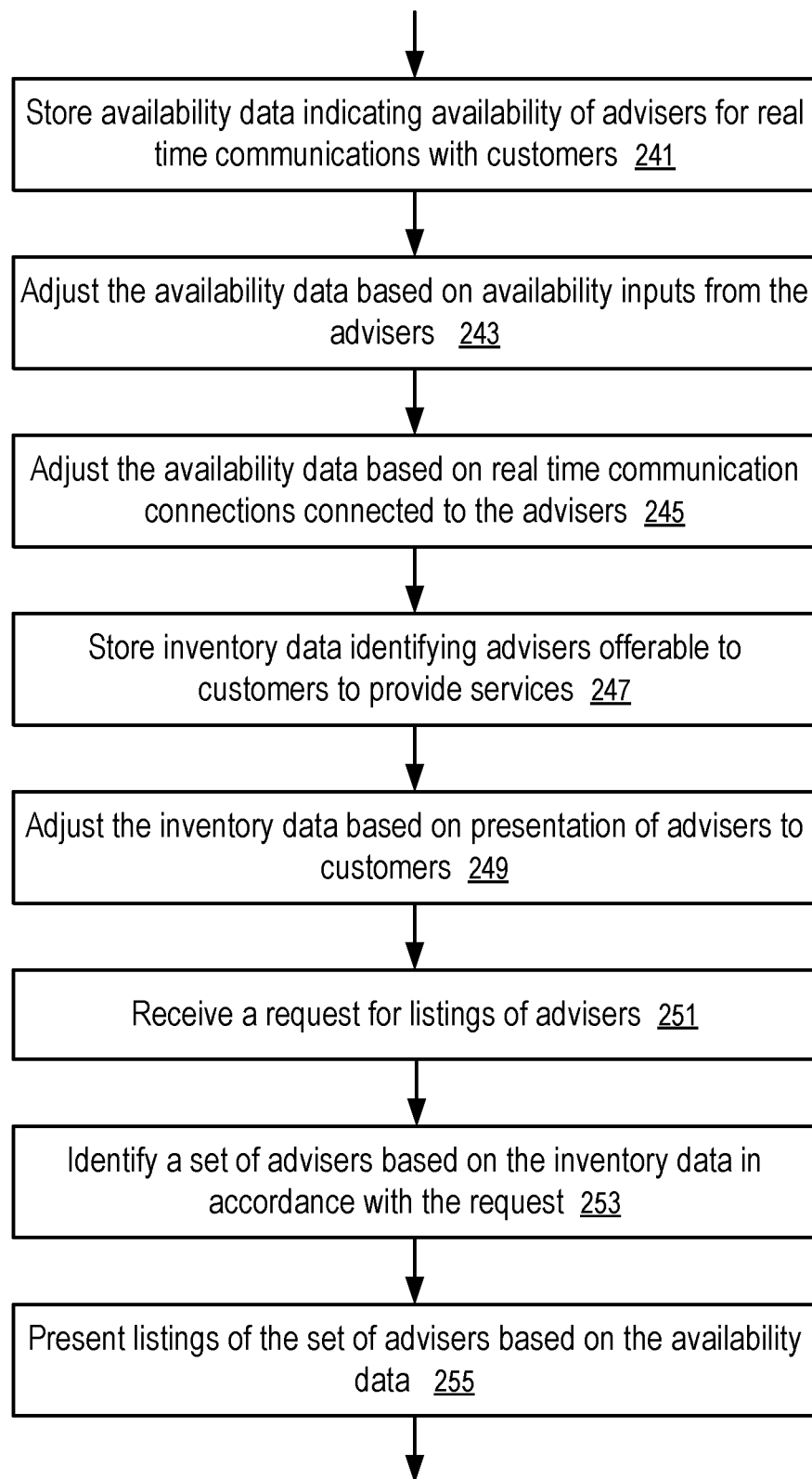
FIG. 4 shows another method to reduce collisions in establishing real-time communication connections according to one embodiment.

In one embodiment, the data store (109) is configured to store not only availability data indicating the current availability status of the advisers to accept real time communication connections, but also inventory data indicating whether the advisers are in the inventory for presentation to potential customers, in a way illustrated in FIG. 4.

FIG. 4 shows another method to reduce collisions in establishing real-time communication connections according to one embodiment. In one embodiment, the method of FIG. 4 is implemented in a communication system illustrated in FIG. 1.

In one embodiment, the data store (109) stores (241) availability data indicating availability of advisers for real time communications with customers. The web server (101) is configured to adjust (243) the availability data based on availability inputs from the advisers.

For example, when an adviser is ready for real time communications with customers, the adviser may sign into the system via the web server (101) to indicate that the adviser is available to accept a real time communication connection with the connection server (13) for delivering services over the real time communication connection to a user phone (e.g., 113, . . . , or 123).

For example, when the adviser wants to block requests for real time communication connection from the connection server (103), the adviser may sign into the system via the web server (101) to provide an indication that the adviser is unavailable (or sign off from the system).

In one embodiment, the connection server (103) is configured to adjust (245) the availability data based on real time communication connections connected to the advisers.

For example, when a connection is established between the connection server (103) and the adviser phone (115), the connection server (103) is configured in one embodiment to update the availability data to indicate that the adviser corresponding to the adviser phone (115) is not available.

For example, in response to disconnecting a telephonic connection between the connection server (103) and the adviser phone (115), the connection server (103) is configured in one embodiment to update the availability data to indicate that the adviser corresponding to the adviser phone (115) is available.

In addition to the availability data indicating the current availability of the advisers to accept real time communications connections, the data store (109) is configured to further store (247) inventory data identifying advisers offerable to customers to provide services.

In one embodiment, the web server (101) is configured to adjust (249) the inventory data based on presentation of advisers to customers.

For example, when the listing of an adviser was presented to a first user within a first predetermined period of time (or when it is determined that the first user is very likely to be connected to the adviser), the web server (101) may mark the listing of the adviser to indicate that the adviser is not in the inventory of advisers that can be presented to other users.

For example, when the listing of the adviser was presented to the first user more than a second predetermined period of time ago (or when it is determined that the first user is less likely to be connected to the adviser), the listing of the adviser can be marked to indicate that the adviser is back in the inventory of advisers that can be presented to other users.

For example, when the listing of the adviser has been selected for a connection by the user who has a high rate of successful connections in the past, the listing of the adviser can be marked to indicate that the adviser is not in the inventory of advisers that can be presented to other users.

In FIG. 4, after the web server (101) receive (251) a request for listings of advisers, the web server (101) (or another server connected to the web server (101)) identifies (253) a set of advisers based on the inventory data in accordance with the request and presents (255) listings of the set of advisers based on the availability data.

For example, if the inventory data indicates that an adviser is not in the inventory for presentation to customers, the listing of the adviser is not selected for presentation to a new customer, even when the adviser is currently available. By removing an adviser out of the inventory for a short period of time after the adviser is being presented in a top portion of a list of advisers, the change of different users selecting the same adviser is reduced.

In one embodiment, the data store (109) is configured to store data indicating the probability of an adviser being connected for delivering services to a user of the system within a predetermined period of time. The web server (101) is configured to rank the advisers based on the probabilities of advisers being connected within the predetermined period of time. An adviser having a high probability of being connected with the predetermined period of time is ranked to have a lower ranking score than a similar adviser having a low probability of being connected with the predetermined period of time. Thus, the system dynamically ranks the advisers to reduce probabilities of collisions in real time communication requests, in a way illustrated in FIG. 5.

Figure 5:
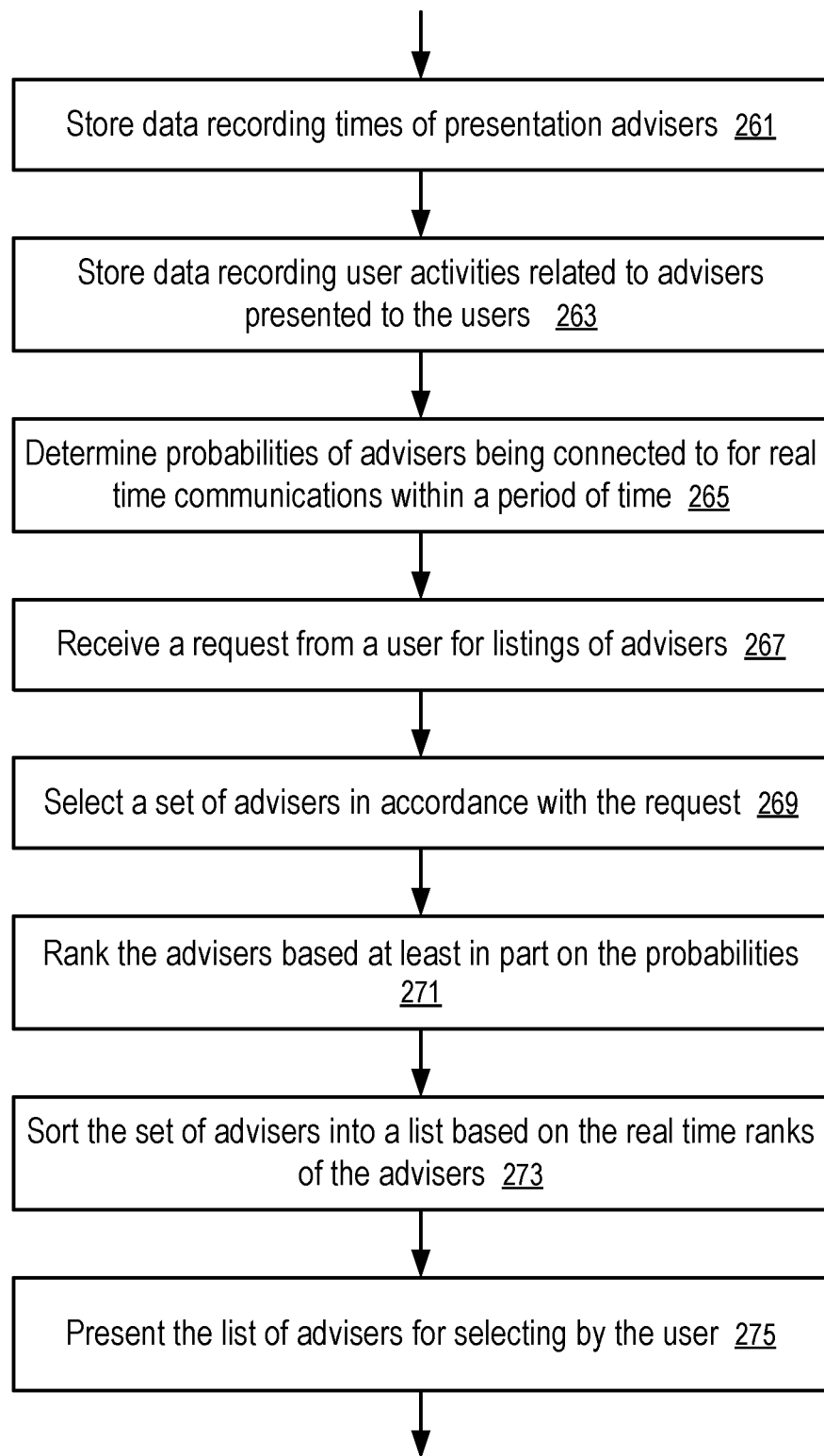
FIG. 5 shows a further method to reduce collisions in establishing real-time communication connections according to one embodiment.

FIG. 5 shows a further method to reduce collisions in establishing real-time communication connections according to one embodiment. In one embodiment, the method of FIG. 5 is implemented in a communication system illustrated in FIG. 1.

In one embodiment, the data sore (109) is configured to store (261) data recording times of presentation advisers and store (263) data recording user activities related to advisers presented to the users.

For example, after the presentation of a list of advisers to a user, the advisers on the lists having different estimated probabilities of being selected based on the positions of the advisers on the list.

For example, after an adviser is selected from the list, the probability of the adviser being connected to the user may be based on the current membership status of the user.

For example, after the user is identified, the probability of the user will be connected to the selected adviser can be estimated based on the prior connection patterns of the user.

In FIG. 5, the web server (101) (or another server connected to the web server (101)) is configured to determine (265) probabilities of advisers being connected to for real time communications within a period of time based on the data recording the presentation times of the advisers (261) and the user activities related to the presented advisers. For example, when more than one user has selected an adviser for a connection, the probability of the adviser being connected to for real time communications increases.

In response to receiving (267) a request from a user for listings of advisers, the web server (101) (or another server connected to the web server (101)) is configured to select (269) a set of advisers in accordance with the request, rank (271) the advisers based at least in part on the probabilities, and sort (273) the set of advisers into a list based on the real time ranks of the advisers. The web server (101) then presents (275) the list of advisers for selecting by the user in the user browser (111).

In one embodiment, the probabilities are adjusted in real time in accordance with the user activities related to the presented advisers, the presentations of the advisers, and the lapsed time since the presentation. In one embodiment, the probabilities are used to weight against the availability of the corresponding advisers in ranking the advisers.

In some embodiments, the methods of FIGS. 3, 4 and 5 are combined.

For example, in one embodiment, the inventor data is used as in FIG. 4 for the selection of the advisers; and the presentation order of the top portion of the list of selected and ranked advisers is randomized as in FIG. 3 to reduce collision.

For example, in one embodiment, the probability of advisers being connected to within a period of time is used as in FIG. 5 for the ranking of the advisers; and the presentation order of the top portion of the list of selected and ranked advisers is randomized as in FIG. 3 to reduce collision.

For example, in one embodiment, the inventor data is used as in FIG. 4 for the selection of the advisers; the probability of advisers being connected to within a period of time is used as in FIG. 5 for the ranking of the advisers; and the presentation order of the top portion of the list of selected and ranked advisers is randomized as in FIG. 3 to reduce collision.

In one embodiment, the system is configured to predict the collision of the progress of multiple users on track to be connected to the same adviser and organize a bidding session for the users to resolve the conflict. Thus, the users are informed of the possibility of losing the currently opportunity for being connected to the adviser; and when the user loses the opportunity to be connected the selected adviser after completing the intervening actions between the selection of the adviser and being connected to the adviser by the connection server (103), the user can be offered to be connected to an alternative adviser, or schedule an appointment.

Figure 6:
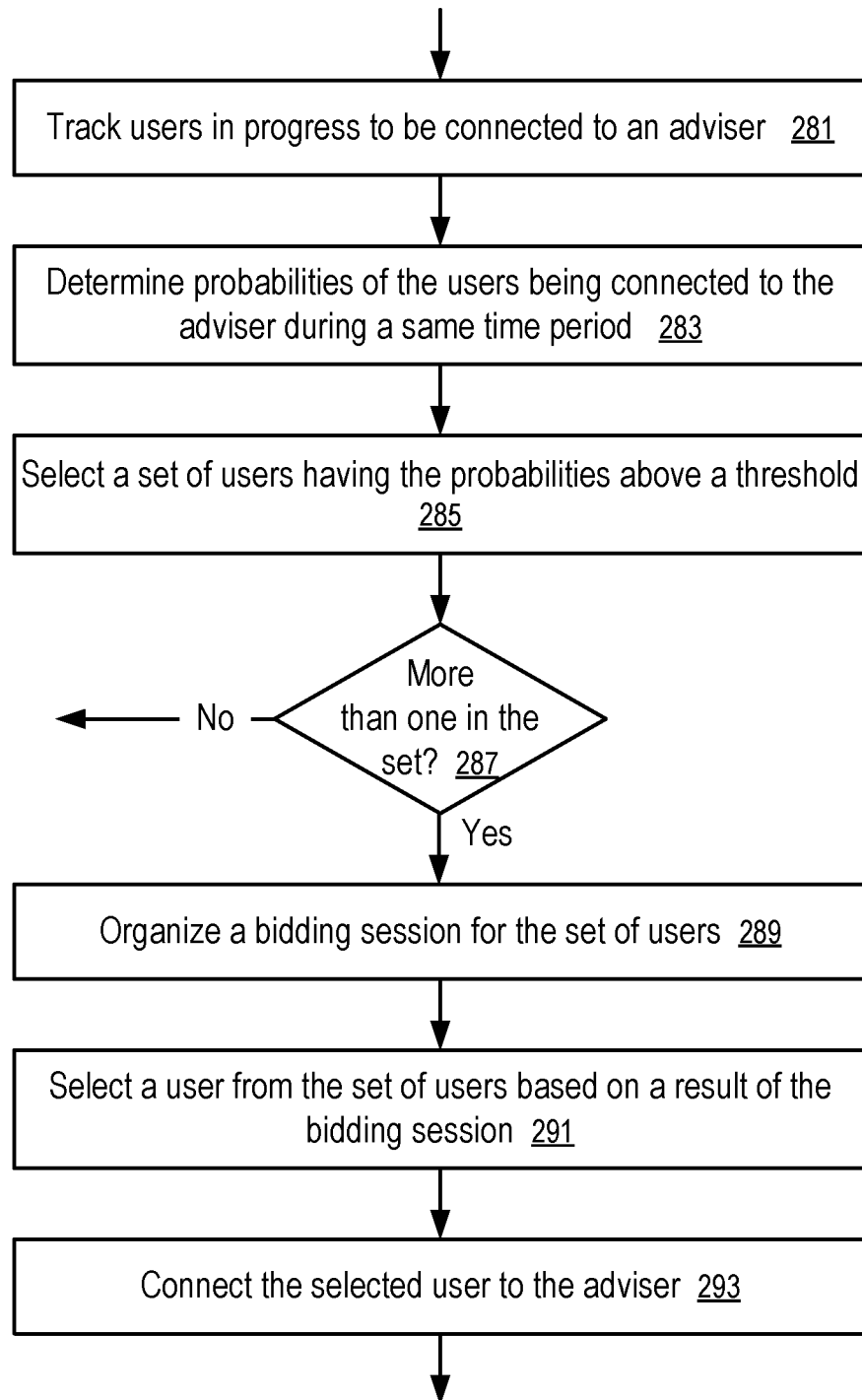
FIG. 6 shows a method to select a user for establishing a real time communication connection to an adviser according to one embodiment.

FIG. 6 shows a method to select a user for establishing a real time communication connection to an adviser according to one embodiment. In one embodiment, the method of FIG. 6 is implemented in a communication system illustrated in FIG. 1.

In FIG. 6, the data store (109) is configured to store data tracking (281) users in progress to be connected to an adviser. The web server (101) (or another server connected to the web server (101)) is configured to determine (283) the probabilities of the users being connected to the adviser during a same time period based on the stored data tracking (281) the progresses of the users.

In one embodiment, a set of users having the probabilities above a threshold is selected (285). If it is determined (287) that more than one user is selected in the set of users, the web server (101) is configured to organize (289) a bidding session for the set of users.

For example, using the user browsers (111, ..., 121), the web server (101) is configured to inform the respective users that there are multiple users on the system in progress to be connected to the same adviser. The users may optionally offer bids for improved priority for being connected the same adviser. In some embodiments, the user interface presented in the user browser (111, ..., 121) also allows a user to select an alternative adviser, if the user loses the bid.

In one embodiment, the bidding session adds a predetermined processing time between the selection of an adviser by a user and the connection of the user to the selected adviser. Thus, multiple users may concurrently enter the stage of being ready to be connected to the selected adviser. In one embodiment, the bidding session ends after the connection server (103) establish the connection to the adviser phone (115); and a user is selected (291) from the set of users based on a result of the bidding session and connected (293) to the adviser.

In some embodiments, the priorities of the users in the bidding session are based at least in part on the progress speeds of the users towards meeting all requirements (e.g., registration, identifying funding source) to establish connection between the user phones (113, ..., 123) with the connection server (103)). A bid offered by a user may increase the priority of the user.

In one embodiment, the priorities of the users in the bidding session are replaced with a racing presentation in which the progress of a user relative to others is presented to indicate the competition among the users, without providing a facility to allow a user to improve his/her priority via increasing a priority bid. Thus, the users may see the real time progress of the respective users competing for the same adviser.

Computing Apparatus

In one embodiment, the operations discussed above are configured to be performed on a computing apparatus, which may include one or more components illustrated in FIG. 1, such as a web server (101), the connection server (103), the data store (109), and/or one or more user devices (e.g., devices running the user browser (111, ..., 121), the user phones (113, ..., 123), adviser phones (115, ..., 125)).

In one embodiment, a user device can be a personal computer, a mobile computing device, a notebook computer, a netbook, a personal media player, a personal digital assistant, a tablet computer, a mobile phone, a smart phone, a cellular phone, etc. The user device can be implemented as a data processing system as illustrated in FIG. 7, with more or fewer components.

Figure 7:
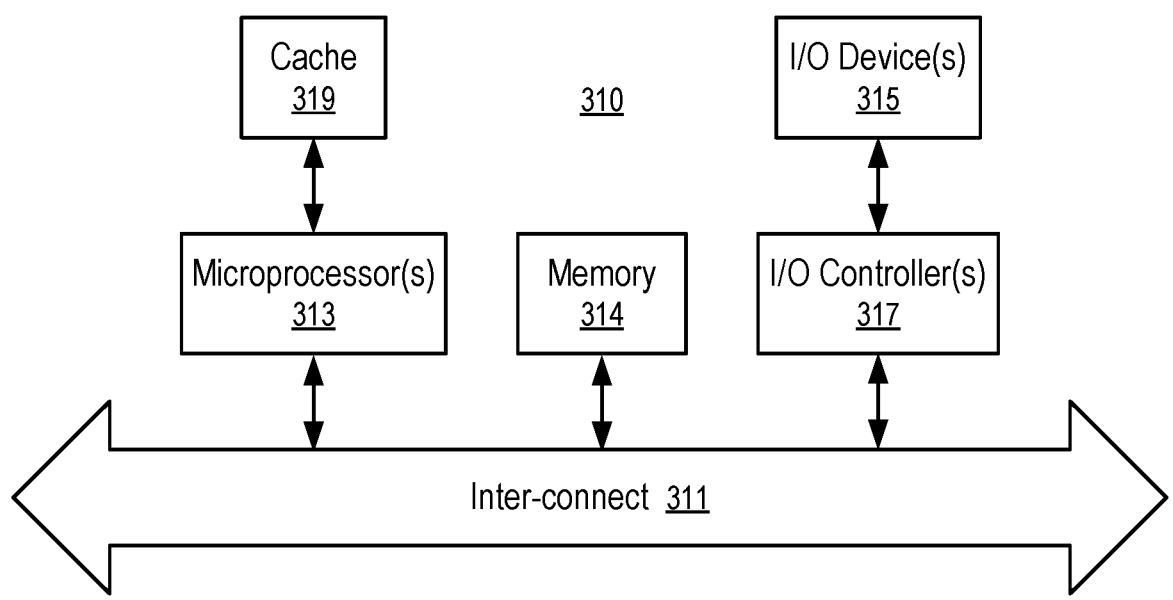
FIG. 7 illustrates a data processing system according to one embodiment.

In one embodiment, at least some of the components of the system disclosed herein can be implemented as a computer system, such as a data processing system illustrated in FIG. 7, with more or fewer components. Some of the components may share hardware or be combined on a computer system. In one embodiment, a network of computers can be used to implement one or more of the components.

In one embodiment, data discussed in the present disclosure can be stored in storage devices of one or more computers accessible to the components discussed herein. The storage devices can be implemented as a data processing system illustrated in FIG. 7, with more or fewer components.

FIG. 7 illustrates a data processing system according to one embodiment. While FIG. 7 illustrates various parts of a computer system, it is not intended to represent any particular architecture or manner of interconnecting the parts. One embodiment may use other systems that have fewer or more components than those shown in FIG. 7.

In FIG. 7, the data processing system (310) includes an inter-connect (311) (e.g., bus and system core logic), which interconnects a microprocessor(s) (313) and memory (314). The microprocessor (313) is coupled to cache memory (319) in the example of FIG. 7.

In one embodiment, the inter-connect (311) interconnects the microprocessor(s) (313) and the memory (314) together and also interconnects them to input/output (I/O) device(s) (315) via I/O controller(s) (317). I/O devices (315) may include a display device and/or peripheral devices, such as mice, keyboards, modems, network interfaces, printers, scanners, video cameras and other devices known in the art. In one embodiment, when the data processing system is a server system, some of the I/O devices (315), such as printers, scanners, mice, and/or keyboards, are optional.

In one embodiment, the inter-connect (311) includes one or more buses connected to one another through various bridges, controllers and/or adapters. In one embodiment the I/O controllers (317) include a USB (Universal Serial Bus) adapter for controlling USB peripherals, and/or an IEEE-1394 bus adapter for controlling IEEE-1394 peripherals.

In one embodiment, the memory (314) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of tangible, non-transitory computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented in a communication system, the method comprising:
    storing, in a computing apparatus configured in the communication system, data identifying a plurality of advisers and
        availability of the advisers for real time communications over the communication system;
    identifying the list of advisers based at least in part on the availability of the advisers and received user input;
    randomizing, by the computing apparatus, a top portion of the list;
    presenting, via the computing apparatus, the list with the top portion randomized in a user interface; and
    providing, by the computing apparatus, a real time communication connection between a user of the user interface and an adviser selected from the list.

2. The method of claim 1, wherein the list of advisers are ranked dynamically in real time in response to the user input.

3. The method of claim 1, wherein the data further identifies inventory of advisers who are not currently in a process of being presented to users for real time communication connections.

4. The method of claim 3, wherein the identifying and ranking is based at least in part on the inventory of advisers who are not currently in the process of being presented to users for real time communication connections at the time of the identifying and ranking.

5. The method of claim 3, wherein the list is configured to identify a particular adviser as being available when the particular adviser indicates to the communication system as being available and no real time communication connection is connected to the particular adviser via the communication system.

6. The method of claim 5, wherein the particular adviser is identified as not being in the inventory when the particular adviser has been presented to a different user of the communication system within a predetermined period of time.

7. The method of claim 6, wherein the ranking is configured to reduce a rank of the particular adviser in response to a determination that the particular adviser is not in the inventory.

8. The method of claim 1, wherein the data further identifies probabilities of advisers to be selected for real time communication with users of the communication system during a predefined time period from the user input.

9. The method of claim 8, wherein the predefined time period is based on an average time period between presenting a particular adviser in a list to a particular user and connecting the particular adviser to the particular user.

10. The method of claim 1, further comprising:
    detecting, by the computing apparatus, that a plurality of users of the communication system are engaging in a process for being connected to the adviser; and
    presenting, via the computing apparatus, a bidding user interface to the plurality of users to select a winning bidder for a connection to the adviser.

11. A computing apparatus configured in a communication system, the computing apparatus comprising:
    at least one network interface;
    at least one microprocessor; and
    memory storing instructions configured to instruct the at least one microprocessor to store data identifying a plurality of advisers and
availability of the advisers for real time communications over the communication system;
identify a list of advisers based at least in part on the availability of the advisers, and received user input;
randomize a top portion of the list;
present, via the at least one network interface, the list with the top portion randomized in a user interface; and
establish, via the at least one network interface, a real time communication connection between a user of the user interface and an adviser selected from the list.

12. The computing apparatus of claim 11, wherein the information of the advisers include user ratings, prices of the advisers, topics, names and descriptions.

13. The computing apparatus of claim 11, wherein the data further identifies inventory of advisers who are not currently in a process between being presented to users and being connected to users for real time communication connections in a process between being presented to users and being connected to users for real time communication connections.

14. The computing apparatus of claim 13, wherein the list is identified and sorted based at least in part on the inventory of advisers who are not currently in the process between being presented to users and being connected to users for real time communication connections.

15. The computing apparatus of claim 13, wherein the list is configured to identify a particular adviser as being available when the particular adviser indicates to the communication system as being available and no real time communication connection is connected to the particular adviser via the communication system; and the particular adviser is identified as not being in the inventory when the particular adviser has been presented to a different user of the communication system within a predetermined period of time.

16. The computing apparatus of claim 15, wherein a rank of the particular adviser for sorting the list is reduced when the particular adviser is not in the inventory.

17. A non-transitory computer storage medium storing instructions configured to instruct a computing apparatus configured on a communication system to perform a method, the method comprising:
storing, in a computing apparatus configured in the communication system, data identifying a plurality of advisers and
availability of the advisers for real time communications over the communication system;
identifying, by the computing apparatus, lists of advisers for the users respectively based at least in part on the availability of the advisers, and received user input;
randomizing a top portion of the list;
presenting the list in a user interface, with the top portion randomized;
and
providing, by the computing apparatus, real time communication connection between the users and the advisers selected by the users from the lists.

18. The non-transitory computer storage medium of claim 17, the method further comprising:
receiving, by the computing apparatus, a plurality of requests from a plurality of users for real time communication connections to an adviser;
scheduling, by the computing apparatus, a bidding session among the plurality of users to select a user;
establishing, by the computing apparatus, a real time communication connection between the user selected by the bidding session and the adviser selected by the plurality of users.

* * * * *